US010208585B2

(12) United States Patent
Surowinski et al.

(10) Patent No.: US 10,208,585 B2
(45) Date of Patent: Feb. 19, 2019

(54) GROUNDWATER MONITORING SYSTEM AND METHOD

(71) Applicant: Intrasen, LLC, Lighthouse Point, FL (US)

(72) Inventors: Steve Surowinski, Lighthouse Point, FL (US); Liang Guo, Frederick, MD (US)

(73) Assignee: INTRASEN, LLC

( * ) Notice: Subject to any disclaimer, the term of this patent is extended or adjusted under 35 U.S.C. 154(b) by 261 days.

(21) Appl. No.: 15/230,750

(22) Filed: Aug. 8, 2016

(65) Prior Publication Data

US 2017/0044894 A1 Feb. 16, 2017

Related U.S. Application Data

(60) Provisional application No. 62/203,876, filed on Aug. 11, 2015.

(51) Int. Cl.
*E21B 47/04* (2012.01)
*G01C 5/06* (2006.01)
(Continued)

(52) U.S. Cl.
CPC ............ *E21B 47/042* (2013.01); *E21B 47/00* (2013.01); *G01C 5/06* (2013.01); *G01P 15/00* (2013.01)

(58) Field of Classification Search
CPC ... G01V 1/40; G01V 1/44; G01V 1/52; G01V 11/00; G01V 2200/00; G01V 2200/16;
(Continued)

(56) References Cited

U.S. PATENT DOCUMENTS 1,735,460 A 11/1929 Hahnemann et al.
4,459,759 A 7/1984 Hulsing, II
(Continued)

FOREIGN PATENT DOCUMENTS

AT 1749 7/1900
CA 1221905 5/1987
(Continued)

OTHER PUBLICATIONS

Kalinov et al., "High-Precision Ultrasonic Water Level Indicator," (Symposium), XXII Session of the Russian Acoustical Society; Session of the Scientific Council of Russian Academy of Science on Acoustics; pp. 254-256, Jun. 15-17, 2010. RU.
(Continued)

*Primary Examiner* — Benjamin R Schmitt
(74) *Attorney, Agent, or Firm* — The Belles Group, P.C.

(57) ABSTRACT

The present invention provides a groundwater monitoring system and method. The system in one aspect uses sound-based distance measurement techniques to measure groundwater level with one transducer generating an acoustic burst and another receiving it. At least one sonic transducer is installed in each of a processor-based controller and traveling probe. The system may use an accelerometer and the pressure sensor installed in the probe to measure groundwater thickness. While the probe moves upward or downward in the groundwater, water properties measured by sensors installed on the probe and corresponding depths of the measuring spots to the groundwater surface level measured by the pressure sensor are recorded. The system measures and saves data, including groundwater level, groundwater thickness, and a depth-related profile of water properties. In certain embodiments, the probe includes a microprocessor operable to control the transducer and sensors mounted thereto and effect two-way communication with the controller.

25 Claims, 5 Drawing Sheets

(51) Int. Cl.
*E21B 47/00* (2012.01)
*G01P 15/00* (2006.01)

(58) Field of Classification Search
CPC .. G01F 23/0023; G01F 23/0061; G01F 23/28;
G01F 23/296; G01F 23/2961; G01F
23/2962; G01F 23/2968; E21B 47/00;
E21B 47/01; E21B 47/04; E21B 47/042;
E21B 47/14; E21B 47/18
USPC .......................................... 73/152.18, 152.54
See application file for complete search history.

(56) References Cited

U.S. PATENT DOCUMENTS

| | | | |
|---|---|---|---|
| 4,489,779 A | 12/1984 | Dickinson et al. | |
| 4,523,465 A | 6/1985 | Fasching et al. | |
| 4,545,242 A | 10/1985 | Chan | |
| 4,562,262 A | 12/1985 | Rieber et al. | |
| 4,669,536 A | 6/1987 | Ames et al. | |
| 4,775,028 A | 10/1988 | De Heering | |
| 4,779,201 A | 10/1988 | Iizuka et al. | |
| 4,804,050 A | 2/1989 | Kerfoot | |
| 4,807,201 A | 2/1989 | Fryda et al. | |
| 4,818,976 A | 4/1989 | Schmitt et al. | |
| 4,934,186 A | 6/1990 | McCoy | |
| 4,963,019 A | 10/1990 | Foster et al. | |
| 5,019,978 A | 5/1991 | Howard et al. | |
| 5,127,266 A | 7/1992 | Maresca et al. | |
| 5,133,625 A | 7/1992 | Albergo et al. | |
| 5,224,389 A | 7/1993 | Jensen et al. | |
| 5,265,477 A | 11/1993 | Inferrera | |
| 5,286,141 A | 2/1994 | Vigneri | |
| 5,293,934 A | 3/1994 | Burge et al. | |
| 5,302,286 A | 4/1994 | Semprini et al. | |
| 5,322,388 A | 6/1994 | Wells | |
| 5,339,694 A | 8/1994 | Looney et al. | |
| 5,481,927 A | 1/1996 | Hubbell et al. | |
| 5,497,091 A | 3/1996 | Bratton et al. | |
| 5,639,380 A | 6/1997 | Misquitta | |
| 5,676,820 A | 10/1997 | Wang et al. | |
| 5,765,964 A | 6/1998 | Calcote et al. | |
| 5,796,679 A | 8/1998 | Yankielun | |
| 5,804,743 A | 9/1998 | Vroblesky et al. | |
| 5,825,188 A | 10/1998 | Montgomery et al. | |
| 6,021,664 A | 2/2000 | Granato et al. | |
| 6,208,940 B1 | 3/2001 | Kram et al. | |
| 6,227,045 B1 | 5/2001 | Morse et al. | |
| 6,272,938 B1 | 8/2001 | Baghel et al. | |
| 6,345,683 B1 | 2/2002 | Gordon et al. | |
| 6,360,599 B1 | 3/2002 | Pathak et al. | |
| 6,456,201 B1 | 9/2002 | Mioduszewski et al. | |
| 6,491,828 B1 | 12/2002 | Sivavec et al. | |
| 6,761,062 B2 | 7/2004 | Shapiro | |
| 6,910,374 B2 | 6/2005 | Keller | |
| 6,928,862 B1 | 8/2005 | Robbins | |
| 7,051,808 B1 | 5/2006 | Vinegar et al. | |
| 7,493,954 B2 | 2/2009 | Heller et al. | |
| 7,551,579 B2 | 6/2009 | Alizadeh-Shabdiz et al. | |
| 7,659,123 B2 | 2/2010 | Ball | |
| 7,662,618 B2 | 2/2010 | Halden | |
| 7,836,760 B2 | 11/2010 | Saylor | |
| 8,100,006 B2 | 1/2012 | Galloway et al. | |
| 8,168,570 B2 | 5/2012 | Barron | |
| 8,215,164 B1 | 7/2012 | Hussain | |
| 8,220,584 B2 | 7/2012 | Haynes et al. | |
| 8,340,927 B2 | 12/2012 | Sung et al. | |
| 8,429,986 B2 | 4/2013 | Lee et al. | |
| 8,616,275 B2 | 12/2013 | Paulsen et al. | |
| 9,181,795 B2 | 11/2015 | Punthakey | |
| 2001/0019106 A1 | 9/2001 | Dehnert et al. | |
| 2003/0035691 A1 | 2/2003 | Sivavec et al. | |
| 2003/0155309 A1 | 8/2003 | Schindler | |
| 2006/0037392 A1 | 2/2006 | Carkner et al. | |
| 2007/0046289 A1 | 3/2007 | Troxler | |
| 2009/0056418 A1 | 3/2009 | Cole et al. | |
| 2009/0066536 A1 | 3/2009 | Ruizenaar | |
| 2009/0107725 A1 | 4/2009 | Christy et al. | |
| 2009/0178797 A1 | 7/2009 | Heller | |
| 2010/0101787 A1* | 4/2010 | McCoy | E21B 43/121 166/250.03 |
| 2012/0227482 A1 | 9/2012 | Ha et al. | |
| 2012/0229623 A1 | 9/2012 | Hsieh et al. | |
| 2013/0138349 A1 | 5/2013 | Kram | |
| 2013/0197810 A1 | 8/2013 | Haas et al. | |
| 2013/0283903 A1 | 10/2013 | Kim et al. | |
| 2013/0333881 A1 | 12/2013 | Heller | |
| 2014/0002088 A1 | 1/2014 | Hudson et al. | |
| 2014/0009302 A1 | 1/2014 | Singer et al. | |
| 2014/0269203 A1 | 9/2014 | Jones et al. | |
| 2015/0041392 A1 | 2/2015 | Hu et al. | |
| 2015/0198733 A1 | 7/2015 | Lie et al. | |
| 2015/0233230 A1* | 8/2015 | Likins, Jr. | E02D 1/02 166/254.1 |
| 2015/0285058 A1 | 10/2015 | Gao et al. | |
| 2015/0300163 A1 | 10/2015 | Tips et al. | |
| 2015/0323363 A1 | 11/2015 | Lee et al. | |

FOREIGN PATENT DOCUMENTS

| | | |
|---|---|---|
| CN | 201071513 | 6/2008 |
| CN | 101216335 | 7/2008 |
| CN | 101261201 | 9/2008 |
| CN | 201297950 | 8/2009 |
| CN | 201716325 | 1/2011 |
| CN | 201819819 | 5/2011 |
| CN | 201983828 | 9/2011 |
| CN | 102352620 | 2/2012 |
| CN | 102435543 | 5/2012 |
| CN | 102539642 | 7/2012 |
| CN | 202370505 | 8/2012 |
| CN | 102706410 | 10/2012 |
| CN | 102937462 | 2/2013 |
| CN | 202734375 | 2/2013 |
| CN | 103601280 | 2/2014 |
| CN | 103712647 | 4/2014 |
| CN | 103926114 | 7/2014 |
| CN | 204064724 | 12/2014 |
| CN | 204066376 | 12/2014 |
| CN | 204086256 | 1/2015 |
| CN | 104329076 | 2/2015 |
| CN | 204142723 | 2/2015 |
| CN | 104406819 | 3/2015 |
| CN | 104776818 | 7/2015 |
| CN | 204439038 | 7/2015 |
| CN | 204556031 | 8/2015 |
| CN | 204612984 | 9/2015 |
| CN | 105040775 | 11/2015 |
| CN | 105043494 | 11/2015 |
| CN | 105091943 | 11/2015 |
| CN | 204783509 | 11/2015 |
| CN | 204795614 | 11/2015 |
| CN | 204807159 | 11/2015 |
| CN | 105158428 | 12/2015 |
| CN | 105178951 | 12/2015 |
| CN | 105203160 | 12/2015 |
| CN | 105203720 | 12/2015 |
| CN | 204831474 | 12/2015 |
| CN | 204875933 | 12/2015 |
| CN | 204877458 | 12/2015 |
| CN | 204903520 | 12/2015 |
| CN | 204940237 | 1/2016 |
| CN | 204944605 | 1/2016 |
| CN | 204965065 | 1/2016 |
| CN | 205000920 | 1/2016 |
| CN | 105300443 | 2/2016 |
| CN | 105301058 | 2/2016 |
| CN | 105320017 | 2/2016 |
| CN | 205015306 | 2/2016 |
| DE | 2221306 | 11/1973 |
| DE | 10113481 | 8/2002 |
| EP | 0315526 | 10/1991 |
| EP | 0596165 | 2/1998 |
| FR | 3017898 | 8/2015 |
| GR | 1003394 | 6/2000 |

(56) References Cited

FOREIGN PATENT DOCUMENTS

| | | |
|---|---|---|
| JP | 61089120 | 6/1986 |
| JP | 62078310 | 4/1987 |
| JP | 62078310 | 5/1987 |
| JP | 08271315 | 10/1996 |
| JP | 2000074724 | 3/2000 |
| JP | 2001146307 | 5/2001 |
| JP | 2001173361 | 6/2001 |
| JP | 2003196776 | 7/2003 |
| JP | 2007256026 | 10/2007 |
| JP | 2008180060 | 8/2008 |
| JP | 2008256386 | 10/2008 |
| JP | 2011064619 | 3/2011 |
| KR | 20050100727 | 10/2005 |
| KR | 20050102853 | 10/2005 |
| KR | 20070110605 | 11/2007 |
| KR | 20090009957 | 10/2009 |
| KR | 100955599 | 5/2010 |
| KR | 100955600 | 5/2010 |
| KR | 20100073687 | 7/2010 |
| KR | 101040070 | 6/2011 |
| KR | 20120123903 | 11/2012 |
| KR | 20130040506 | 4/2013 |
| KR | 101425631 | 8/2014 |
| KR | 20150036846 | 4/2015 |
| KR | 101528831 | 6/2015 |
| KR | 20160000236 | 1/2016 |
| SU | 1135903 | 1/1985 |
| WO | 9407147 | 3/1994 |
| WO | 200524415 | 3/2005 |
| WO | 201397996 | 7/2013 |
| WO | 201557800 | 4/2015 |
| WO | 201574101 | 5/2015 |
| WO | 201584957 | 6/2015 |

OTHER PUBLICATIONS

International Search Report for corresponding PCT/US2016/045978, dated Oct. 31, 2016. WO.

* cited by examiner

GROUNDWATER MONITORING SYSTEM AND METHOD

CROSS-REFERENCE TO RELATED APPLICATIONS

The present application claims the benefit of priority to U.S. Provisional Application No. 62/203,876 filed Aug. 11, 2015, which is incorporated herein by reference in its entirety.

BACKGROUND

The present invention generally relates to a groundwater monitoring system and related method.

Groundwater is a finite resource. More than 44 percent of the people in the United States use groundwater as drinking water, including almost everyone who lives in rural areas. Moreover, the large use for groundwater is to irrigate crops. Therefore, to keep groundwater safe and sustainable is critical for human wellbeing.

Groundwater supplies are replenished, or recharged, by rain and snow melt that seeps down into the cracks and crevices beneath the land surface. Due to overuse, groundwater level declines, and eventually will lead to dry wells. Groundwater is susceptible to pollutants as well. In areas where material above the aquifer is permeable, pollutants can readily sink into groundwater supplies. Groundwater can be polluted by landfills, septic tanks, leaky underground gas tanks, and from overuse of fertilizers and pesticides. Groundwater contamination causes it to become unsafe and unfit for human use. Having groundwater under well management is important to ensure its sustainable application. Water monitoring is the initial step for groundwater management. Information generated by groundwater monitoring system will notice if the water is sustainable and will guide to corrective actions.

Some existing approaches and systems usable for monitoring groundwater are limited by the types of data which can be collected, accuracy, ease of use, and other factors. Furthermore, some systems rely on manual deployment and manipulation of subterranean probes used for monitoring and characterizing various aspects of the groundwater table making such systems operator intensive and incapable of remote data collection and monitoring.

An improved system for monitoring groundwater is needed.

SUMMARY

Embodiments of the present invention provide a method and system useful for investigating and monitoring an underground aquifer or groundwater. In certain implementations, the system measures and records groundwater level, groundwater thickness, and depth related profile data of water properties within the aquifer. Groundwater level is the distance from ground surface or "grade" to the groundwater table (i.e. groundwater surface level). Groundwater thickness is the distance from the subterranean groundwater surface to the bottom of the groundwater. Depth profile of water properties are groundwater properties, including physical and chemical properties (including presence of contaminants), measured at different locations or depths within the groundwater. The invention is designed to be used in places including but not limited to wells, boreholes, and open water, for applications such as for example short-term and long-term groundwater characterization, mine water monitoring, salt water intrusion studies, potable water recharge area studies, groundwater contamination monitoring and remediation, spill investigations, hazardous materials storage monitoring, landfill and waste site monitoring. Numerous other application are possible.

Accordingly, one aspect of the invention is therefore a groundwater monitoring system configured and operable to automatically measure groundwater level (i.e. distance to the groundwater table below grade). Another aspect of the invention is a groundwater monitoring system configured and operable to automatically measure groundwater thickness. A further aspect of the invention is a groundwater monitoring system configured and operable to measure groundwater properties at different depths from the groundwater table. These aspects are further described in detail herein.

To implement the foregoing aspects, one non-limiting embodiment of an automatic groundwater monitoring system according to the present disclosure comprises generally at least two main components. One component is an electronic processor-based controller which in one embodiment may generally be located above ground at grade proximate to the topside well or borehole head of a groundwater well or borehole formed through the ground (i.e. terra firma) to access and investigate the water table. The other component is a probe configured to collect data or information relevant to the groundwater monitoring and characterization operations. The probe is the travelling vessel which linearly moves up and down within the borehole and groundwater. The probe's vertical location/position in the borehole and groundwater may be operably controlled and adjusted by the topside controller in some embodiments. The probe may be in two-way communication with the controller via wired or wireless means to allow the transfer of data and control commands between the probe and controller at the top of the well.

In one embodiment, the system may include at least two sonic transducers which may be used for measuring the distance between the probe and the well or borehole head. One is a stationary transducer mounted at the head of the well or borehole, and the other is a moving transducer mounted to the probe which travels upwards/downwards in the well. One of the stationary or moving sonic probes is a transmitter or emitter operable to emit an acoustic wave through the well which is received by the other of the stationary or moving sonic transducers which is a receiver operable to receive and detect the acoustic wave. The acoustic wave generated propagates up or down the borehole or well (depending on which transducer is the transmitter). In one embodiment, the transducer at the well or borehole head may be transmitter and the transducer in the probe may be the receiver; however, these roles may be reversed in other implementations. The controller may be programmed to generate an acoustic wave with the transmitter/emitter on either a substantially continuous or intermittently time intervals as the probe travels down the borehole. Using continuous acoustic wave emission allows continuous distance measurement of the probe as it travels down the borehole so that the controller knows at all time how far down the probe is below the well head.

In addition to the transducers, the probe may also include one or multiple types of sensors installed therein. In one embodiment, the probe includes a conductivity sensor operable to detect the presence and surface level of the groundwater in the well, as further described herein. The sensor may further include an accelerometer sensor, a temperature sensor, and a pressure sensor. The combination of the transmitter and travelling receiver provide point-to-point distance measurement since there are two spatially separated devices which communicate with each other to measure distance via sound waves, as further described herein. Furthermore, the sensors may also include but are not limited to one or more water chemistry sensors, such as pH, oxidation reduction potential (ORP), sensors measuring inorganic or organic compounds in the water, and/or other sensors.

To accomplish one of the aforementioned aspects, the groundwater level may be measured using sound waves or signals emitted and received by the transducers as noted above. Any suitable frequency of sound may be used technique, such as without limitation ultrasonic in one example (e.g. frequency greater than 20 kHz). However, the frequency of the sonic wave is expressly not limited to ultrasonic frequencies alone and transducers which emit sonic waves with frequencies below the ultrasonic range may be used.

One embodiment of the system and method therefore utilizes at least a pair of sonic transducers, including one sonic transducer installed preferably in or near the controller above the ground at the top of borehole or well, and at least one other sonic transducers installed in the probe below grade. One of the transducers installed either in the controller or alternatively in the probe can be the transmitter which generates the sound wave, and the generated sound wave is received by the remaining other of the sound transducers (or transducers) in the probe or in the controller thereby comprising at least one pair of a transmitter and receiver. Accordingly, the transmitter may be fixed or stationary in position and the receiver may be fixed or stationary position in various configurations of the system contemplated, depending on which of the transducers is mounted in the controller and probe.

The distance between the controller and probe is automatically calculated by the controller having an appropriately configured circuit and/or running a suitable software instruction routine using the soundwave speed and elapsed time between the sonic transmitter transmission and reception by the receiver. In some embodiments, the controller may apply a temperature and/or barometric pressure correction factor to the calculated distance for enhanced accuracy in detection the surface level of the groundwater table. Temperature sensors may be mounted in the probe and controller for this purpose. The groundwater level is calculated by the distance between the controller and probe via the spatial separation determined between the two sonic transducers when the probe touches groundwater the first time during traveling downward in the borehole. In one embodiment, the water surface may be detected by a change in conductivity sensed by the conductivity sensor mounted in the probe, as further described herein.

To accomplish another of the aforementioned aspects, groundwater thickness is measured by the accelerometer and a pressure sensor(s) installed in the probe. When the probe touches the bottom of the groundwater, the probe becomes axially tilted in orientation, which is detected by accelerometer sensor. Groundwater thickness is then measured and calculated by the controller using the pressure sensor at the time when the probe touches the bottom of groundwater and tilts using the pressure differential between the atmospheric pressure within the bore hole or well at the surface of the water table and pressure at the bottom of the groundwater proximate to the probe.

To accomplish another of the aforementioned aspects, while the probe travels in the groundwater, distance between the probe to the groundwater table is measured by a pressure sensor installed in the probe to pinpoint the depth of the probe in the groundwater. The other sensors installed in the probe, such as without limitation the conductivity sensor, temperature sensor, and various water chemistry/property sensors also installed in the probe may measure various water properties to develop a characteristic profile of the groundwater at each depth travelled by the probe.

The processor associated with the controller may be configured via programmable instructions or control logic to measure the distance between the well or borehole head transducer and probe transducer by emitting and receiving an acoustic wave between the two transducers at appropriately timed intervals on a continuous or intermittent basis. Data collected by other sensors in the probe may be measured either continuously or intermittently.

In some embodiments, the controller can be programmed to control the cable drum used to lower or raise the probe at varying speeds depending on the type of monitoring activity being performed. For example, when finding the groundwater level or surface, the controller may drop the probe at a greater speed to save time until the surface of the groundwater is encountered by the probe. However, the probe preferably should travel slower when first striking the water surface or bottom of the groundwater aquifer in order to obtain accurate groundwater level and thickness measurements. In another embodiment, the controller can also be programmed with an auto-reverse feature which reverses direction of the probe back upwards for a small distance via a micro movement back out of the water once detected, and then more slowly lowers the probe again to re-engage the water surface. Because the surface of the groundwater may be 150 feet or more below ground level, either of the foregoing approaches may translate into potential productivity improvement allowing more wells to be investigated in a shift, and concurrently provides a more precise measurement of the groundwater level automatically without operator manipulation of the probe. The same auto-reverse feature may be used when contacting a hard surface at the bottom of the groundwater for obtaining a thickness measurement.

It will be understood that aspects of the present invention describe herein may be embodied in the form of electronic processor implemented processes and apparatus for practicing those processes.

In one embodiment, a groundwater monitoring system includes: a borehole extending downwards through terra firma and defining a borehole head at grade; a controller disposed proximally to the borehole head and comprising programmable electronic circuitry having a processor; a rotatable cable drum positioned at the borehole head; a movable probe disposed in the borehole and operably coupled to the drum via a cable, the drum rotatable in a first direction to raise the probe and in a second direction to lower the probe in the borehole; a drive mechanism operable to rotate the drum in the first or second directions; a first sonic transducer mounted at the borehole head; a second sonic transducer mounted to the probe, the first and second sonic transducers in communication with the controller which is operable to measure a distance between the first and second transducers; one of the first or second transducers being a transmitter operable to emit an acoustic wave which is received by the other of the first or second transducers being a receiver; and a conductivity sensor mounted to the probe and operable to detect groundwater in the borehole; wherein when the conductivity sensor detects the groundwater, the transmitter emits the acoustic wave which is received by the receiver and the controller converts a time delay between transmission and reception of the acoustic wave to a distance indicative of a surface level of the groundwater below grade.

In another embodiment, a groundwater monitoring system includes: an underground aquifer; a borehole extending underground between the aquifer and a borehole head at top located at a ground surface; a rotatable cable drum positioned at the borehole head and comprising a spool of cable; a drive mechanism coupled to the cable drum and operable to rotate the drum in opposing directions; a movable probe disposed in the borehole and operably coupled to the cable, the drum rotatable via the drive mechanism in a first direction to raise the probe and in a second direction to lower the probe in the borehole; a controller comprising programmable electronic circuitry including a processor and memory, the controller operably connected to and controlling operation of the drive mechanism; a stationary sonic transducer mounted at the borehole head; a movable sonic transducer mounted to the probe and spatially separable from the first sonic transducer, the stationary and moving transducers in communication with the controller; one of the stationary or movable sonic transducers being a transmitter emitting an acoustic wave which is received by the other transducer being a receiver; and a conductivity sensor mounted to the probe and operable to detect a groundwater in the borehole; and an accelerometer disposed in the probe, wherein when the probe contacts a hard surface at a bottom of the groundwater, the accelerometer becomes tilted which triggers the system to measure a thickness of the groundwater.

A method for monitoring groundwater is provided. In one embodiment, the method includes steps comprising: providing a probe having at least one sensor and an electronic controller with a processor and electric drive mechanism controlled by the processor, the drive mechanism operably coupled to the probe for lowering or raising the probe in a borehole having a top accessible at ground grade; the controller automatically lowering the probe down the borehole at a first speed with the drive mechanism; contacting and sensing groundwater in the borehole with the probe a first time; a sonic transmitter at the probe generating and directing an acoustic wave upwards in the borehole upon sensing the groundwater; receiving the acoustic wave with a sonic receiver at the top of the borehole; the controller automatically calculating a first time delay between transmission and reception; and the controller automatically converting the first time delay into a first distance measured between the transmitter and receiver which is indicative of the groundwater level below grade.

BRIEF DESCRIPTION OF THE DRAWINGS

The accompanying drawings are schematic and not intended to be drawn to scale. For purposes of clarity, not every component may be labeled in the drawings, nor is every component of each embodiment of the invention shown where illustration is not necessary to allow those of ordinary skill in the art to understand the invention. In the drawings.

DETAILED DESCRIPTION

The features and benefits of the invention are illustrated and described herein by reference to exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range.

It is to be understood that certain phraseology and terminology used herein is for the purpose of description and should not be regarded as a limitation on the present invention. The use of "system" is meant to hardware. Terms of "include", "comprise", or "have" and variations thereof herein is meant to encompass the items listed thereafter and equivalents thereof as well as additional items. Unless specified or limited otherwise, the terms "mounted", "installed", "located" and variations thereof are used broadly and encompass both direct and indirect mountings, installations, and locations. As the term is used herein, "groundwater" is used in its customary sense in the art to refer to a long term reservoir of water located within the ground. The term "groundwater table" is used in its customary sense in the art to refer to the surface of the groundwater exposed to an atmospheric pressure beneath the surface of the terra firma or ground.

Figure 1:
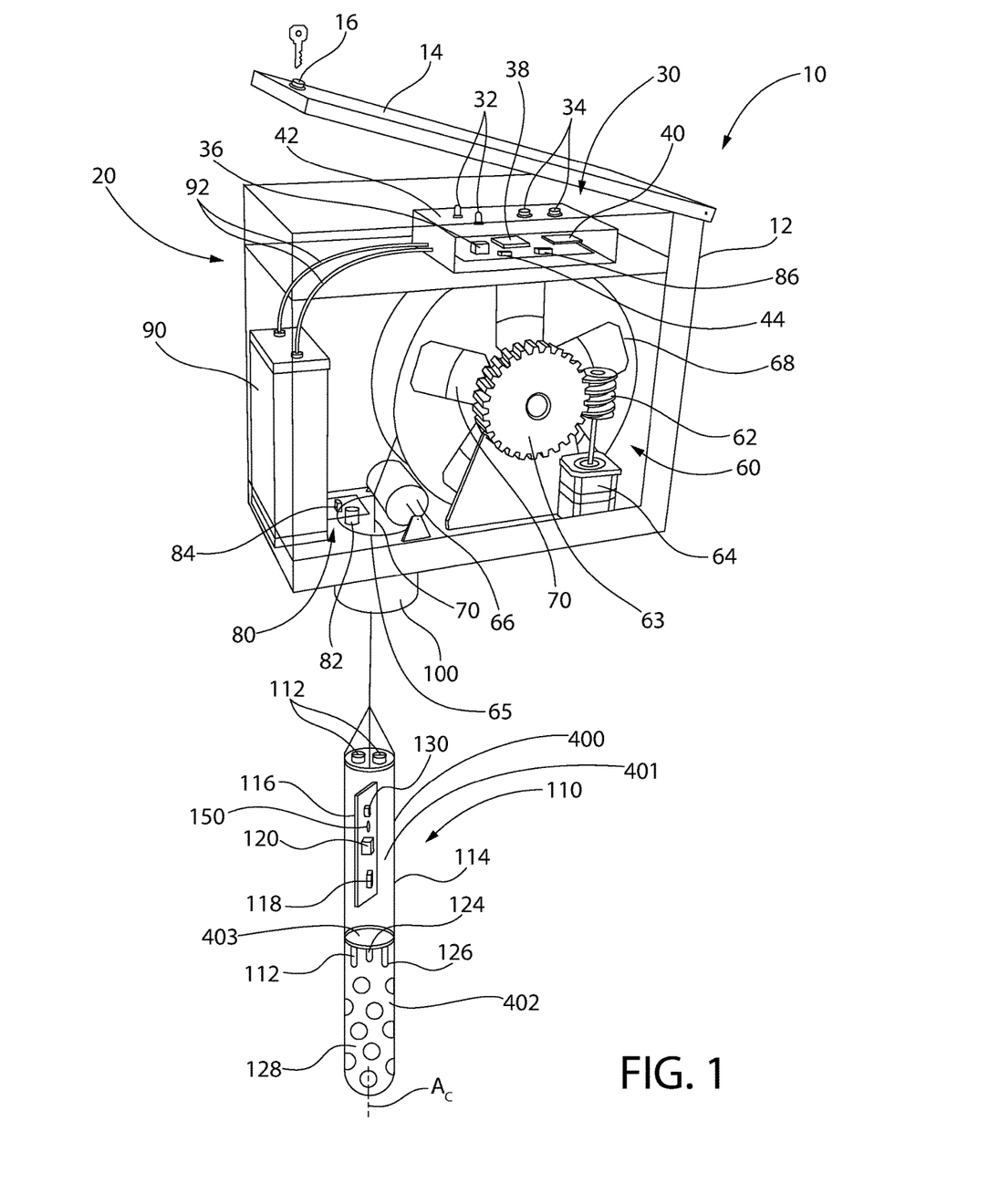
FIG. 1 is a perspective view of a groundwater monitoring system with automatic control of probe movement and position according to one of the present invention.

FIG. 1 shows one implementation of a groundwater monitoring system 10 according to one non-limiting embodiment of the invention. The groundwater monitoring system 10 generally includes a controller 20 and a probe 110. The controller 20 can be installed above ground with a mounting device 100, such as on top of a pipe 140 emplaced within a borehole or well drilled through the terra firma (or simply "ground") in the usual manner to access the groundwater table or surface 210 (see also FIG. 2). In such an embodiment, the mounting device 100 may comprise a cylindrical collar (illustrated) configured for coupling to the open top of the borehole pipe. In other embodiments, the mounting device of course may have configurations for mounting the controller proximate to the borehole or well pipe 140. It bears noting that the borehole or well pipe 140 may contain perforations to allow groundwater to infiltrate into the interior of the pipe for access by and immersion of the probe 110.

The controller 20 may also comprise a protective enclosure such as box 12 which houses all components and protects them against environmental conditions. The box 12 includes a top, opposing bottom, and plurality of sidewalls extending between the top and bottom defining a perimeter. The mounting device 100 may be disposed on the bottom of the box 12 as illustrated. The box has an openable/closeable cover 14 which may have a lock 16 to protect components from unauthorized access. The cover 14 may be pivotably attached to the box via pins or hinges; however, in other embodiments the cover may be completely removable and latched onto sidewalls of the box.

Inside the controller box 12 in one embodiment, there is a processor 30, an elevator 60 operably coupled to the probe 110, a top sensor 80, and a power source 90 as further described herein.

The controller 20 includes a processor 30 which controls operation of the groundwater monitoring system 10 and two-way communication between the probe 110 and controller. Appurtenances associated with the processor 30 in one embodiment may generally include a microprocessor 38, a user interface which may comprise various operating status lights or LEDs 32, control buttons 34, a communication interface 40, and memory storage 36. Processor 30 includes all necessary circuits, programming, and other apparatuses requiring for a fully functional system operable to execute program instructions or control logic (e. software), control operation of the groundwater monitoring system, and acquisition and transmission of data collected. The controller 20 may include a pressure sensor 86 which may measure barometric pressure, humidity sensor 44, and enclosure 42 which houses and protects the electronics. A top sensor array 80 includes sonic transducer 82 and temperature sensor 84. Preferably, the top sensor array 80 is positioned at the top of the borehole or well pipe 140 and in communication with the interior of the pipe when the controller 20 is mounted. A power source 90 can be a battery installed in the box 12. Alternatively, a power source can be an external power source connected with the processor 30 via a power adapter interface. The power source 90 provides electric power for the groundwater monitoring system 10 with electric cable 92 connected to the processor.

The processor 30 controls operation of elevator 60 which raises or lowers the probe 110 within the borehole or well pipe 140 to access the groundwater 230. Elevator 60 generally comprises of a roller 66, a cable reel or drum 68, cable 70 of suitable length wound around the drum, and a drive mechanism which moves probe 110 up and down and adjust its vertical position in well or borehole. In the illustrated embodiment of FIG. 1, the drive mechanism may be an electric motor 64 whose operation is controlled by the controller 20 (i.e. processor 30). Motor 64 is mechanically coupled to the cable drum 68 and operates to rotate the drum in opposing first and second direction for raising or lowering the probe respectively. Motor 64 may be a variable speed motor in some embodiment to raise/lower the probe 110 at different speeds or rates for purposes further described herein. The speed of the probe 110 translating linearly within the borehole or well 140 may therefore be automatically adjusted via control by the processor 30.

In one implementation, the electric drive mechanism may include a worm gear 62 mounted on the drive shaft of the motor 64. Worm gear 62 is mechanically coupled to a mating spur gear 63 mounted to the central hub of the cable drum 68. The cable drum 68 is thus rotated by worm gear 62 via motor 64. The cable 70 is guided from the drum through an opening 65 in the bottom of the controller box 12 by roller 66. Opening 65 is preferably concentrically aligned and communicates with the borehole or well pipe 140. The probe 110 speed may be adjusted in one non-limiting implementation within a range from about and including 0 to 100 feet/minute. This ensures smooth probe movement with minimized stress on cable during probe travel.

It will be appreciated that in other embodiments, the motor 64 may instead be coaxially aligned with the central hub of the cable drum 68 which may be directly coupled to the drive shaft of the motor. This arrangement would eliminate the worm and spur gears described above for the off-axis arrangement, which may result in a more compact footprint. However, either of the foregoing drive arrangement approaches may be used.

As described above, at least one sonic transducer 82 is installed with the controller at the well head 141, and at least one sonic transducer 112 is installed in the probe. A redundant or back up transducer 112 may be provide in some embodiments. One transducer is a sound transmitter or emitter and the other is a sound receiver. In one preferred but non-limiting embodiment, the topside controller transducer 82 may be the transmitter. In one embodiment, the controller 20 controls and triggers transducer 82 to generate a sound burst or acoustic wave which is received by one or more sonic transducers 112 in the probe 110 for distance measurement between the probe and well head. In different embodiment, the probe 110 via its circuitry and/or a second processor such as microprocessor 120 controls the controller sonic transducer 82 to generate the acoustic wave or sonic burst which is received by transducer 82 in controller 20 for distance measurement, or alternatively the probe sonic transducer 112 may generate the acoustic wave. This functionality may be accomplished in one embodiment by the processor program instruction or control logic.

The controller 20 has a user interface 32 and 34, including visual indicators and input devices for system operation and diagnostics. For one configuration, as shown in FIG. 1, the user interface may include buttons 34 and LED lights 32. The user can start the groundwater monitoring system 10 and control various operation thereof by pressing buttons 34, and LED lights 32 will indicate working condition or status of the system 10 to the user, such as power on, groundwater level measurement status, maintenance request, etc. For some other configurations, the user interface can include a keypad and visual display in addition to or instead of buttons and/or lights. Yet other embodiments may further include input/output jacks for connection to a cellular phone, tablet, laptop computer, or other electronic device having a processor and memory to download/upload commands, files, data, software, etc. Yet in other embodiments communications between such electronic devices and the controller may be effectuated by wireless means through the user interface 32 configured with appropriate hardware and/or software. Accordingly, the types and numbers of user interfaces and indicators may be selected as appropriate for the circumstances and is not limiting of the invention.

Memory storage 36 as used herein is a tangible non-transitory machine-readable medium or media that participates in directly or indirectly providing signals, instructions and/or data that can be read by a machine or computer processor. A machine-readable medium may take forms, including, but not limited to, non-volatile media (e.g., optical disk, magnetic disk), and volatile media (e.g., semiconductor memory, dynamic memory). Common forms of machine-readable mediums include floppy disks, hard disks, magnetic tapes, RAM (Random Access Memory), ROM (Read Only Memory), EEPROM (Electrically Erasable Programmable memory), CD-ROM (Compact Disk ROM), and others. The invention is not limited to the type of computer-readable medium that may be used.

Memory storage 36 may contain pre-programmed with program instructions or control logic (e.g. software) executed by processor 30 and configured to cause the processor to control various aspects and operation of the groundwater monitoring system 10 as described herein. The pre-programmed "instructions" or "control logic" as used herein includes but is not limited to hardware, firmware, software and/or combinations thereof to perform a function(s) or an action(s), and/or to cause a function or action from another logic, method, and/or system. Instructions or logic may include a software controlled microprocessor, discrete logic (e.g., application specific integrated circuit (ASIC)), an analog circuit, a digital circuit, a programmed logic device, a memory device containing instructions (e.g. memory storage 36), and so on. Instructions or logic may include a gate(s), a combinations of gates, other circuit components, and so on. Where multiple logical logics are described, it may be possible in some examples to incorporate the multiple logical logics into one physical logic. Similarly, where a single logical logic is described, it may be possible in some examples to distribute that single logical logic between multiple physical logics.

Memory storage 36 in the processor 30 periodically records data measured by sensors installed in the controller 20 and the probe 110 with a time stamp, which is the current date and time. The memory storage 36 capacity allows data to be saved for years without overwrite. The memory storage 36 may include internal memory storage, such as an integrated circuit, and external memory storage, such as SD card, USB memory stick, etc.

The processor 30 has a communication interface 40 that allows software and data to be transferred via two-way communications between the controller 20 and external devices. For example, communication interface 40 may be operable to transfer collected data by groundwater monitoring system 10 to an external device, or to download program instructions or control logic to the processor 30 for local storage in memory storage 36. Such external devices which may communicate with controller 20 include as examples but is not limited to a computer, server personal digital assistant (or PDA), tablet, cellular phone, data logger, etc., for data processing and analysis. Communication interface 40 may further be operable to allow such external devices to remotely control operation of the groundwater monitoring system 10. It bears noting that the communication interface 40 is used by the operation or user of the groundwater monitoring system 10 for either a remote or on-site location proximate to the controller to program instructions into processor 30 which guide operation of the controller 20 and probe 110, as further described herein. User interface 32/34 is intended more for local manual interaction of the operator with the controller 20 and system.

The communication interface 40 may include without limitation wired interfaces such as USB, RS485, RS232, etc., and wireless interfaces such as Bluetooth, ZigBee, WIFI, GSM, GPRS, LTE, narrow band radio, etc. For one example configuration, an external computer can be connected with the processor 30 using a USB communication interface or via any of the foregoing wireless protocols. For another example configuration, a PDA, tablet, or other electronic device can be connected with the processor 30 using a Bluetooth® communication interface. Data saved in memory storage 36 can be transferred to the external processor-based electronics devices (e.g. computer, server, tablet, cellular phone, PDA, etc.). Working history and status of the groundwater monitoring system 10 can be displayed and recorded by such a device via the communication interface. It will be appreciated that the external devices may be located anywhere, including on-site proximate to the groundwater well or off-site distal to the well which may include cloud storage.

Software and data transferred to controller 20 via communications interface 40 may be in the form of signals which may be electronic, electromagnetic, optical, or any other signal capable of being transmitted and received by the communications interface. These signals are provided to the communications interface 40 via a communications path or channel. The path or channel that carries the signals may be implemented using wire or cable, fiber optics, a telephone line, a cellular link, a radio frequency (RF) link, or other wireless protocols.

In one embodiment, FIG. 1 shows the probe 110 comprising various sensors and a microprocessor 120 housed in a cylindrical enclosure 114. The enclosure 114 is designed to be completely submersible and protect the electronics and sensors that must remain dry which cannot contact groundwater. The enclosure 114 may include cylindrical sidewalls 400 defining a dry upper chamber 401 sealed from the ambient environment to prevent infiltration of groundwater and an adjoining wetted lower chamber 402 separated from the upper chamber by a partition wall 403. The upper chamber 401 contains a control board 116 including the microprocessor 120, memory 130, battery 150 (if microprocessor is not powered by hard wiring to controller 20) and other electronics including some sensors (e.g. accelerometer 118, etc.) intended to remain dry when the probe is immersed in groundwater. The lower chamber 402 contains sensors (e.g. conductivity sensor 126, temperature sensor 122, pressure sensor 124, etc.) intended to be wetted for measuring and collecting groundwater specific properties or conditions. Sensors in the lower chamber 402 are covered and protected by a perforated case 128 of the enclosure 114 which allows infiltration of groundwater into chamber 402. The microprocessor 120 in the probe operates and communicates with the sensors. Sensors may include the pressure sensor 124, temperature sensor 122, conductivity sensor 126, accelerometer sensor 118, and other water chemistry sensors such as pH sensor, ORP (oxidation-reduction potential) sensor, etc. For one configuration, microprocessor 120 is powered by a battery installed in the probe. For some other configurations, the microprocessor can be powered by power source connected with the controller 20 via an electric cable 70.

Figure 2:
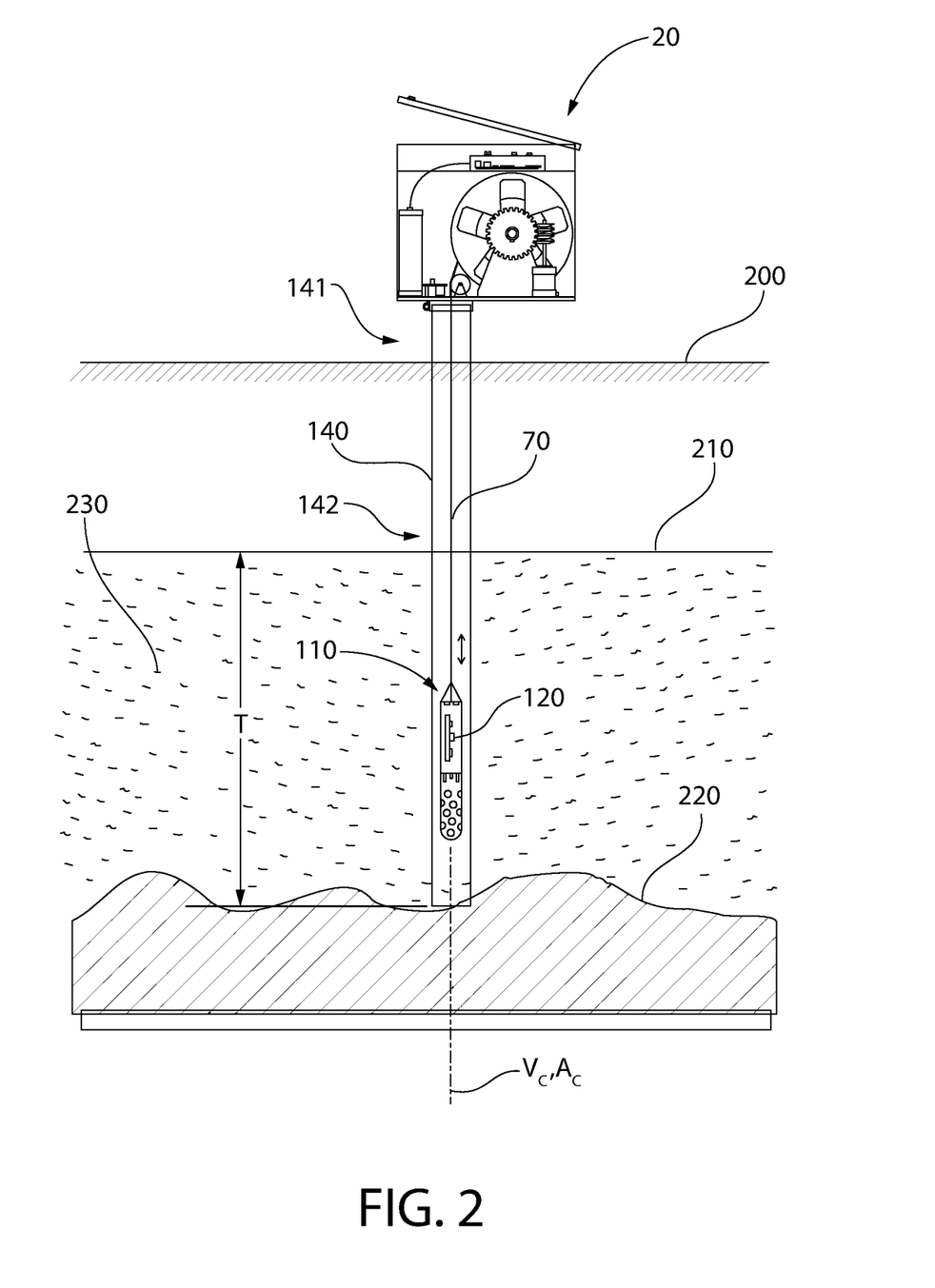
FIG. 2 is a schematic diagram of a groundwater monitoring system installed on top of a borehole or well.

FIG. 2 shows a schematic diagram of a groundwater monitoring system installed on top of the well or borehole 142 (the terms being used interchangeably herein). In one non-limiting preferred embodiment, processor 30 controls sonic transducer 82 installed in the controller 20 and generates an acoustic wave or sound burst either continuously or intermittently which propagates downward in the borehole which is received by sonic transducers 112 in the probe 110. In a different embodiment, however, the microprocessor 120 in probe 110 and/or controller 20 controls sonic transducers 112 in the probe 110 which generates the acoustic wave or sound burst.

The controller 20 may be programmed via instructions/control logic (i.e. software) to generate an acoustic wave with the sonic transmitter/emitter on either a substantially continuous basis (e.g. defined herein as less than 1 second which for practical purposes may be considered "continuous") or intermittently at longer programmed timed intervals (e.g. 1 or more seconds) as the probe travels down the borehole. In one embodiment, the sonic transmitter/emitter generates an acoustic wave on a continuous basis. Advantageously, this allows the controller to continuously track and calculate the location of the probe 110 (i.e. distance between land or ground surface 200 and probe) at all times while descending in the air column of the borehole 142 above the groundwater surface 210. This operating mode also permits the controller 20 to generate a temperature profile (i.e. temperature versus depth of probe in borehole 142) for the air column above the groundwater surface in the borehole).

When the probe 110 reaches groundwater table surface 210, microprocessor 120 or controller 20 can recognize the presence of water due to a conductivity change from infinite to a finite value detected by conductivity sensor 126 in the probe. It will be appreciated that because the controller 20 is in constant two-way communication with the microprocessor 120 and probe, the controller and processor know instantaneously when this event occurs. The elapsed time between generating and receiving the acoustic burst is captured by controller 20 or microprocessor 120. The elapsed time multiplied by the speed of sound in the borehole results in the distance between the probe 110 and the controller 20, which is used to calculate the groundwater surface level. The groundwater level is the distance between groundwater table surface 210 and the terra firma or land (ground) surface 200 at the well head 141. A counter pre-programmed into and executed by the controller 20 or microprocessor 120 via the control logic/instructions may be used to calculate the elapsed time. The counter is started once the groundwater surface 210 is detected and the acoustic wave is generated by the transducer-transmitter, and stopped once the wave is received by the transducer-receiver.

The sound generation system may be operated in two different modes. In a first mode, the system may be programmed to generate an acoustic wave by either transducer 82 or 112 on a continuous basis. The probe microprocessor 120 and topside controller 20 via their two-way continuous communication know the instant that the groundwater surface 210 is detected by conductivity sensor 126. With the counter described above, the system (controller 20 or microprocessor 120) then tracks the acoustic wave generated by the transducer-transmitter which coincides with the instant ground water surface 210 is detected with the time that particular wave is received by the transducer-receiver for measuring the elapsed time. Alternatively, in a second operating mode the acoustic wave is generated on an intermittent basis as described above. The system may trigger the transducer-transmitter to generate the acoustic wave the instant that the groundwater surface is detected (even if between the pre-programmed time intervals) and track the sound reception time by the transducer-receiver for measuring the elapsed time. Either scenario allows the groundwater surface 210 level to be determined by the controller 20 or microprocessor 120.

For optimum accuracy in detecting the groundwater surface 210, the controller 20 is preferably programmed with and applies an algorithm to compensate the sound speed calculated with correction factors for parameters such as temperature, humidity, and/or air pressure (e.g. barometric pressure) measured respectively by the temperature sensor 84 (e.g. thermistor), humidity sensor 44, and pressure sensor 86 located in the controller 20, and/or temperature sensor 122 (e.g. thermistor) or pressure sensor 124 installed in the probe 110. It bears noting that if probe pressure sensor 124 is used in this capacity to correct the speed of sound in the air column above the groundwater level, the sensor is measuring barometric pressure which contrasts with the situation of employing the same sensor to detect water pressure when profiling the groundwater. In one embodiment, at least a temperature compensation factor is used, and preferably in other implementations at least temperature and humidity compensation is used which have a greater effect on the speed of sound than barometric pressure. As probe 110 travels down borehole 142, controller 20 measures the air temperature in the borehole air column using probe temperature sensor 122 to determine and compensate for speed of sound variation based on temperature profile of the air column between the top of the well where the controller is installed and surface 210 of groundwater in the well. For example, the ambient air temperature at the top of the borehole may be 70 degrees Fahrenheit while the temperature in the borehole 142 just above the water surface at 50 or more feet below grade may only be 45 degrees.

According to another aspect of the invention, the controller can be programmed to control the cable drum 68 rotational speed and direction to lower or raise the probe 110 at varying linear speeds depending on the type of monitoring activity being performed. For example, when finding the groundwater level or surface, the controller may drop the probe at a greater speed to save time until the surface of the groundwater is encountered by the probe. However, the probe necessarily must travel slower when first striking the water surface to accurately obtain both groundwater level and thickness measurements.

In addition to measuring groundwater level and thickness, the groundwater monitoring system is further operable to measure, record, and construct a depth-correlated profile of groundwater characteristics and properties within the aquifer using the various probe-mounted sensors described herein and/or others. To collect reliable and accurate profile data, the probe 110 preferably is deployed to travel slower through groundwater while profiling the groundwater than initially lowering the probe through the borehole 142 above the groundwater surface 210. Advantageously, this prevents disturbing the body of groundwater and possibly mixing various stratification layers therein which may contain different characteristics and concentration of contaminants or toxins at varying elevations.

To accomplish the foregoing automatically controlled variable speed operation and objectives, the powered drive mechanism elevator 60 shown in FIG. 1 is preferably used. The controller 20 is configured via programmed instructions or control logic executed by processor 30 to automatically control the descent and ascent speed of the probe 110, as well as the direction of probe travel. In one embodiment, the probe 110 is moved upward or downward within the groundwater 230 by elevator 60 and the velocity of probe is controlled by the processor 30 which controls the rotational speed of the cable drum 68 via operation of motor 64 which may have a variable speed drive. The electrically powered elevator 60 in one embodiment is configured to provide adjustable probe speed and adaptive speed adjustment which automatically changes the speed of the probe based on the monitoring activity being performed and the probes location within the well or groundwater. This is useful for not only obtaining groundwater profile information, but also for quickly finding the groundwater surface 210 and bottom 220 of the water as further described herein.

For creating an accurate groundwater profile of various groundwater properties and presence of contaminants, the controller 20 may be programmed via instructions or control logic executed by processor 30 to lower or raise the probe 110 through the groundwater depths at a slower rate than the initial descent speed of the probe down the borehole 142 above the groundwater surface. This probe operation may be automatically triggered by initial contact of the probe with the groundwater surface 210 which is detected by conductivity sensor 126, thereby signaling the controller 20 to initiate the slow speed mode. While the probe 110 is travelling through the groundwater, microprocessor 120 installed in probe 110 operates sensors 122, 124, 126 (and other sensors that may be installed therein) to measure various water properties and detect the potential presence of contaminants to build the groundwater profile. The data acquired by sensors at each water depth within the groundwater 230 is recorded and stored by the microprocessor 120. The probe memory 130 may be used to store the collected data before it is sent to the controller 20 at the well head 141 on the topside or simultaneously with the transmission. Data transmission between probe 110 and controller 20 can occur by either using a signal cable (e.g. twisted pair of control wires) or wirelessly.

The controller 20 may further be programmed in some implementations to automatically adjust the speed of the probe depending on the gradient value of the one or more groundwater physical/chemical properties being measured while constructing the depth-correlated profile. The larger the gradient of groundwater properties measured, the lower the probe speed used by the controller. The reverse is true is so that the smaller the gradient, the higher the probe speed that can be used. Accordingly, the controller 20 controls the probe speed in real time based on the contemporaneous values of the groundwater properties being detected and measured as the probe 110 vertically traverses the water. This adjustable probe speed operation is intended to optimize measurement time to achieve the desired groundwater profiling accuracy.

In some embodiments, the controller 20 is further configured via pre-programmed instructions or control logic executed by the processor 30 to implement an auto-reverse feature comprising a reverse micro-movement of the probe 110 for increasing accuracy when locating the groundwater level 210 or bottom 220. The controller 20 automatically stops and reverses the travel direction of the probe 110 for a short distance by reversing rotation of the cable drum 68. This can be achieved by rotating the drive shaft of the motor 64 in a reverse or opposite direction when the groundwater level or bottom are first detected by the probe 110. As an example, when the cable drum 68 is rotated in a first direction to lower the probe 110 and the conductivity sensor 126 is initially immersed in and detects the groundwater level 210 a first time, the probe sends a control signal to the controller to automatically initiate the reverse micro-movement of the probe. The motor direction is reversed which in turn rotates the drum 68 in an opposite second direction to raise and withdraw the probe (and conductivity sensor) at least partially from the groundwater. Preferably, the probe 110 is removed from the groundwater at a slower speed in the reverse upwards direction than when first contacting the groundwater surface.

During operation of the auto-reverse "micro-movement" feature, it bears noting the probe 110 need only be raised by a distance at least sufficient to remove the conductivity sensor 126 from the groundwater until water is no longer detected by this sensor (i.e. conductivity change from a finite value in the water to infinite out of the water). In some embodiments, this may be less than the length of the elongated probe 110 or one to a few lengths of the probe may be used as a safety margin. In some non-limiting examples, the bottom of the probe 110 is preferably raised by distance less than 10 feet above the groundwater surface 210, and more preferably 5 feet or less. The distance the probe is to be raised may be pre-selected and programmed into processor 30.

Following the reverse micro-movement of the probe 110, the controller 20 then automatically rotates the drum back in the first direction again to now more slowly lower and re-immerse the probe (and conductivity sensor) into the groundwater which is detected for a second time by conductivity sensor 124. Preferably, the speed with which the probe 110 is lowered the second time to re-engage the groundwater surface 210 is also slower than the initial descent rate of the probe to first reach the groundwater surface for improving accuracy in detection of the actual groundwater surface level 210. The controller 20 then records the distance between the well head transducer 82 and probe transducer 112 the second time which represents a precise groundwater level 210.

It will be appreciated that controller thus may be programmed to lower the probe 110 at a faster rate to initially reach the groundwater surface 210 more quickly. Advantageously, this saves time especially if an operator accompanies deployment of the groundwater monitoring system 10 for recording groundwater information. Given that the groundwater level may be 100 or more feet below grade, this allows the operator to survey more wells in a given period of time. It further bears noting that the controller 20 can be programmed to automatically repeat the micro-movement more than once upon initial detection of the groundwater surface level.

Figure 3:
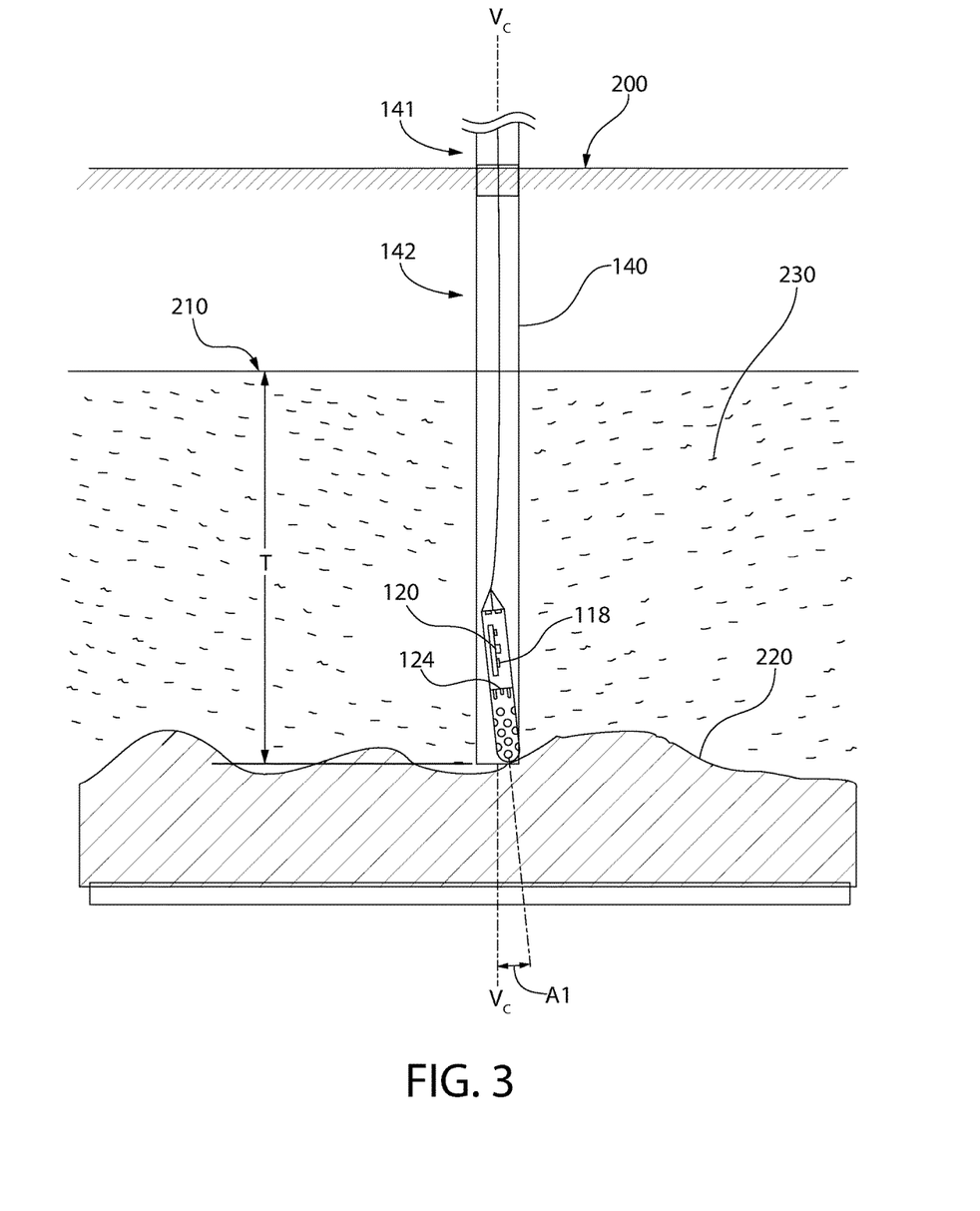
FIG. 3 is a schematic diagram of the probe touching groundwater bottom for groundwater thickness measurement.

The foregoing micro-movement action of the probe 110 may also be used in the same manner described above for detecting the groundwater level when locating the bottom 220 of the aquifer for improved accuracy using the accelerometer 118 as described elsewhere herein. In this application, the probe 110 needs only be raised within the groundwater after the bottom 220 of the groundwater is first detected by a distance which is sufficient to un-tilt and return the probe to an upright vertical position. The probe is then lowered at the slower speed as described above until the probe re-engages the groundwater bottom 220 and becomes titled in position again (i.e. non-vertical) tilts which is detected by the accelerometer 118. The thickness T of the groundwater is then measured and recorded as described elsewhere herein.

In some embodiments, the probe 110 may be self-powered to operator microprocessor 120 and the sensors such as via a rechargeable or non-rechargeable battery 150 (see, e.g. FIG. 1). In other embodiments, the cable 70 may be an power cable or may include a power cable to power the probe electronics and sensors from the controller or other source of power at the well head 141.

FIG. 3 illustrates an operating scenario and other aspect of the invention for measuring the thickness T of the groundwater. Groundwater thickness is measured by a combination of both accelerometer sensor 118 and pressure sensor 124 installed in the probe 110. Both accelerometer 118 and pressure sensor 124 are in communication with the probe-mounted microprocessor 120. The pressure sensor 124 may continuously record and transmit the measured pressure values within the groundwater to the probe microprocessor 120. When probe 110 touches or contacts a hard surface at the bottom 220 of the water, it becomes tilted as illustrated (i.e. oblique angle A1 is formed between the probe centerline Ac and well vertical axis Vc). This titled condition is detected by accelerometer sensor 118, which sends a signal to the microprocessor 120. The microprocessor then captures the measured pressure value detected by pressure sensor 124 and executes a pre-programmed logic routine or calculation operable to convert the pressure value to groundwater thickness. In other embodiments, this information is relayed to controller processor 30 which performs the calculation. In one embodiment, the microprocessor 120 measures the groundwater thickness via the pressure differential calculated between the pre-recorded atmospheric pressure within the well at the surface level 210 of the groundwater 230 (i.e. air to water interface) and groundwater pressure measured by the sensor 124 at the bottom 220 of the groundwater proximate to the probe which is converted to distance. The microprocessor 120 in the probe 110 records the groundwater thickness at the time when the probe becomes tilted (e.g. in probe memory 130) equated to the bottom 220 of the groundwater and relays this information topside to the controller 20 for local storage in memory or transmission off-site via wired or wireless means (e.g. remote monitoring station or location in communication with one or more groundwater monitoring systems 10).

Figure 4:
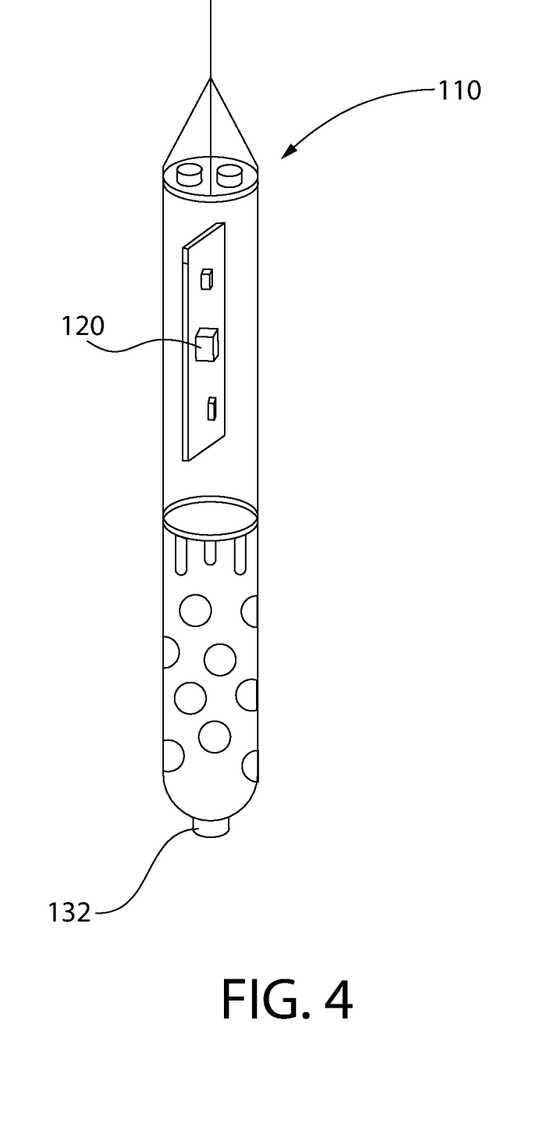
FIG. 4 is a perspective view of an alternative embodiment of a probe with a sound transducer mounted at the bottom of probe.

FIG. 4 shows another example of probe 110 with a sonic transducer 132 installed at the bottom tip of the probe 110. Microprocessor 120 in the probe 110 controls and triggers the transducer 132 to generate an acoustic wave or burst continuously or intermittently which is directed downward in the borehole 142 toward the groundwater surface 210 before the probe initially contacts the groundwater surface for the first time. The controller sonic transducer 82 at the well head 141 detects a reflection of the acoustic wave to ascertain the distance between the probe 110 and groundwater surface 210 on a continual or intermittent bases as the probe advances downward in the borehole 142. Because the groundwater surface is measured and detected in advance, adjustable speed operation of probe is possible wherein the controller automatically slows the probe down to more gently engage the groundwater for obtaining an accurate groundwater level measurement. Advantageously, this aspect allows the controller 20 (i.e. processor 30) to lower the probe 110 at a greater initial speed (e.g. 1 foot/second) to save time until the probe is within a pre-programmed distance above the surface 210 of the groundwater (e.g. within 10 or less feet, or another distance). When the pre-programmed distance is reach, the controller then reduces the speed of the probe to encounter the groundwater surface 210 (e.g. 1 inch/second). Advantageously, this multiple speed descent rate of the probe while traveling in air within the borehole above the groundwater allows more wells to be surveyed within a work shift. It bears noting that the auto-reverse feature may be used instead of or in addition to the bottom transducer 132 and multi-speed probe operation to realize the same time-saving benefits. It bears noting that the probe bottom transducer 132 does not replace probe transducer 112 which generates a sonic burst when the conductivity sensor 126 detects water as describe herein.

Figure 5:
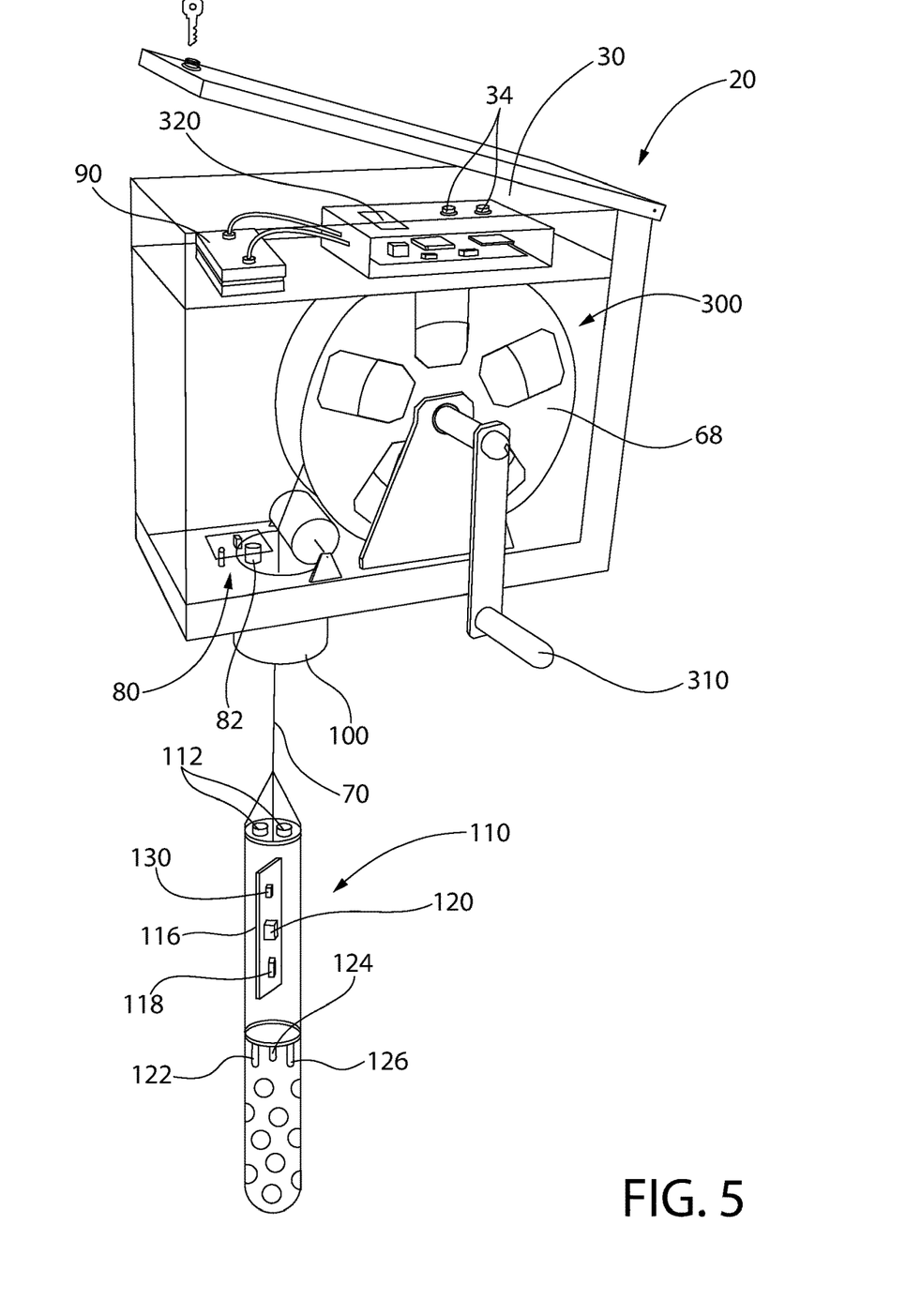
FIG. 5 is a perspective view of the groundwater monitoring system of FIG. 1 with an alternative embodiment of manual control of probe movement and position.

In another embodiment of a groundwater monitoring system according to the disclosure, FIG. 5 shows groundwater monitoring system 10 which has a drive mechanism comprising a manually operated elevator 300 to control movement of the probe 110. Other than manual operation of the elevator and cable drum 68, the manual system may be identical in all other aspects (e.g. component and functional) to the groundwater monitoring system already described above with the automatically operated elevator 60 shown in FIG. 1. Accordingly, FIG. 5 illustrates one controller 20 comprising of a manual elevator 300, processor 30, top sensor 80, and a battery 90. The controller is installed on top of a pipe with a mounting device 100. The crank 310 is used to manually rotate cable drum 68 in opposing directions which moves the probe 110 up and down in a borehole.

Controller 20 has a guiding function that provides an operator with an audible feedback as the operator manually drops the probe in the well. The controller produces short audible beeps repeated with frequency which is function of proximity of the probe to groundwater surface. The closer probe is to groundwater surface 210, the more frequent beeps will occur and less time between beeps, the further away from water surface, the less frequent the beeps and longer time interval. When probe is within a certain distance from the water surface (e.g. 1 or 2 feet), the beep becomes continuous in sound alerting the operator that the probe 110 is very close to the water surface 210 so that the operator slows down the probe descent. This minimizes potential errors when touching/contacting the water as well as reduces the possible need to repeat the measurement if probe were to be dropped too fast. This feature is available for a probe 110 with an installed second distance measurement sensor (i.e. bottom-mounted sonic transducer 132) described herein and shown in FIG. 4.

However, if a regular probe 110 as shown in FIG. 1 is used without the bottom transducer 132, the controller 20 may still be programmed to offer visual feedback for the operator where a single light indicator (e.g. LED or lamp installed on the controller visible to the operator) or sound being generated by the controller when probe touches the water surface and being turned off when probe is above the water. As operator is probing the water surface looking at the visual indicator or listening to the audile tone coming on and off, the point to point distance measuring system continuously monitors the distance (e.g. between transducer 82 and 112) and the control algorithm expects to see the distance changes (fluctuations) with the operator/user raising or dropping the probe to become less as operator probes the water surface. Once user induced probe movements stop or the operator raises the probe way up or conversely dunks probe deep into the groundwater, the control algorithms calculates the median of distance from samples collected when operator was probing/dunking probe in the water surface. This may be referred to as an automatic trigger function. With this function, the operator does not have to press any buttons to capture the actual water surface level. Use of remotely connected device like a smartphone allows operator to send measurements data automatically upon the trigger from the system to his smartphone without the operator need to press any buttons during measurements. This allows the operator to focus on the probe movement by cranking the drum handle. No need to defocus and use one of the hands to write down the measurement with the possible risk of losing grip of the handle 310 or the drum 68.

In some embodiments in lieu of the foregoing visual and/or audible beep-type alerts, where a controller-connected smartphone or dedicated smart device is used, the system may further include a voice guided function to guide the operator with voice synthesized instructions in lowering the probe in the well. The guide is synchronized with present conditions of the probe and it depends on distance of the probe from the top of the well and distance from the water surface. The voice guiding function will also inform the operator about trigger events (e.g. water surface contact, etc.) and measurement results data transfer to connected smart. The smart device may be in communication with and connected to the controller by any suitable wired or wireless communication protocols, examples of which are provided herein with respect to communication interface 40 (e.g. Bluetooth®, WiFi, cables, etc.). To obtain the voice command guidance functionality, the smart device may be provided with a download software application to enable voice synthesized commands to be generated which are triggered by communication signals sent to the device from the controller 20.

In operation, after installing the controller box on the top of the borehole, a user starts processor 30 by pressing button 34. The controller processor 30 controls two-way communication between sonic transducer 82 installed in the controller 20 and sonic transducers 112 in the probe 110. The user rotates the cable drum 68 by using manual crank 310 to move the probe down toward groundwater. Once the probe contacts or touches the groundwater surface 210, microprocessor 120 triggers an acoustic signal to be generated by either top-side transducer 82 or probe transducer 112 due to conductivity change from infinite to finite value detected and measured by conductivity sensor 126 in the probe 110. The acoustic signal is received by the other of the transducers. Groundwater level is then calculated with the distance between the controller and the probe measured using the sonic measurement technique already described herein when the probe recognizes groundwater. The controller 20 records the groundwater level. As probe 110 travels downwards within the water, water properties including conductivity and temperature measured by sensors, such as conductivity sensor 126 and temperature sensor 122 in the probe 110, are recorded together with distance between water surface and probe, which is measured by pressure sensor 124 in the probe. The data can be shown on the display 320 installed in the controller. Alternatively, the data can be wirelessly transferred to an external device, such as PDA, tablet, or computer for example.

In some preferred embodiments, all measurements and data obtained by the controller 20 and/or microprocessor 120 are stored with a real time stamp. The controllers/processors as well as the probe continuously synchronize time between each other during system operation. This ensures chronology in data capture from sensors installed on both ends of the system: the topside controller 20 and the travelling probe 110.

According to another aspect of the invention, the groundwater monitoring system 10 may track water level 210 changes and fluctuations by use of probe movement to test water level using the probe conductivity sensor 126. This is a discrete method (e.g. 0/1 or Yes, No) of detecting the groundwater surface using the same methodology as initially locating the groundwater surface 210 using the conductivity as already described herein. The controller 20 automatically raises and lowers the probe 110 via operation of the elevator 60 which follows the rise or fall in the groundwater surface. The controller may use programmed time intervals for monitoring the groundwater level on a time-stamped basis, or may monitor the level on a continuous time-stamped basis. The probe up and down movements in the well 142 will follow the water surface changes ensuring constant a data stream describing water level changes for real time monitoring. This method is applicable for the motorized elevator 60 shown in FIG. 1.

In another aspect, the groundwater monitoring system 10 may also monitor the thickness T of the groundwater table on an intermittent or continuous time-stamped basis. This aspect uses pressure sensor 124 mounted in the probe 110. The probe 110 may be "anchored" at a fixed elevation within the water table. As the thickness or depth of the water table fluctuates, the pressure sensor 124 readings will change. The controller 20 and/or probe microprocessor 120 uses the same pressure differential between the surface 210 of the groundwater and the probe location to determine the thickness T of the groundwater in the same manner already described herein. After the bottom elevation of the groundwater or aquifer is first established, the probe may then be raised a set distance off the bottom (e.g. 1 to 2 feet, or other) to an un-tilted position for monitoring groundwater thickness changes.

According to one aspect, the groundwater monitoring system 10 is programmable and operable to conduct automatic probe monitoring location or depth selection for repeating various monitoring activities, such as without limitation profiling of the body of groundwater with respect to physical and/or chemical properties as already described herein. For example, if a particular depth/location within the aquifer is of interest from a prior groundwater property survey (e.g. potential infiltration and contamination from brackish sea water), that specific location (or group of locations) can be programmed into the controller 20 which can quickly lower the probe 110 to that exact depth/location for additional monitoring or data collection. This same approach may be used for relocating the surface level 210 of the groundwater after completing the initial groundwater survey, or for other uses or reasons. In operation, a user or operator programs the specific location(s) into the controller processor 30 via communication interface 40, which in different circumstances and implementations, may be via a wired or wirelessly connected smart device (e.g. cell phone, PDA, tablet, etc.), or alternatively a remote access computer. The controller 20 then operates the motorized elevator 60 shown in FIG. 1 to lower the probe 110 to the programmed location(s). If plural locations are to be explored, these may be vertically adjacent depths/elevations within the groundwater (e.g. depth 25 feet below groundwater surface 210, 26 feet, 27, feet, etc.) or different depths/elevations spaced vertically apart (e.g. 20 feet below groundwater surface, 25 feet, 30 feet, etc.). In some embodiments, a range of contiguous depths/locations may be selected and programmed into controller 20 (e.g. 20 to 30 feet below groundwater surface 210).

According to another aspect, the groundwater monitoring system may further be operable to automatically calibrate the probe pressure sensor 124 in conjunction with tracking groundwater bed thickness fluctuation over time by leaving the probe 110 submerged within the groundwater table. The microprocessor 120 (or alternatively the controller 20) can be programmed on a periodic basis or on demand to automatically calibrate the pressure sensor 124 by zeroing out the sensor after the probe 110 is pulled out of water with elevator 60. Advantageously, this eliminates pressure reading errors caused by drift of the pressure sensor after remaining in the groundwater for a period of time (e.g. days to years). The "out of water" position of the probe 110 can be confirmed using conductivity sensor 126 installed on the probe. The microprocessor 120 will coordinate the automatic calibration for the pressure transducer. The calibration action can be triggered by preset time or frequency, such as one week or month, or can be ordered by operator on site or remotely using user interface 34 or the communication interface 40.

Having thus described the invention in detail, it is to be understood that the foregoing description is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. The figures depict selected embodiments and are not intended to limit the scope of embodiments of the invention. Certain features may be shown in somewhat schematic form. Thus, embodiments of the invention are not intended to be limited to embodiments shown, but are to be accorded the widest scope consistent with the principles and features disclosed herein. Further, it is to be appreciated various alterations, modifications, and improvements will readily occur to those skilled in the art. Such alterations, modifications, and improvements are intended to be part of this disclosure, and are intended to be within the spirit and scope of the disclosure.

What is claimed is:

1. A groundwater monitoring system comprising:
   a borehole extending downwards through terra firma and defining a borehole head at grade;
   a controller disposed proximally to the borehole head and comprising programmable electronic circuitry having a processor;
   a rotatable cable drum positioned at the borehole head;
   a movable probe disposed in the borehole and operably coupled to the drum via a cable, the drum rotatable in a first direction to raise the probe and in a second direction to lower the probe in the borehole;
   a drive mechanism operable to rotate the drum in the first or second directions;
   a first sonic transducer mounted at the borehole head;
   a second sonic transducer mounted to the probe, the first and second sonic transducers in communication with the controller which is operable to measure a distance between the first and second transducers;
   one of the first or second transducers being a transmitter operable to emit an acoustic wave which is received by the other of the first or second transducers being a receiver; and
   a conductivity sensor mounted to the probe and operable to detect groundwater in the borehole;
   wherein when the conductivity sensor detects the groundwater, the transmitter emits the acoustic wave which is received by the receiver and the controller converts a time delay between transmission and reception of the acoustic wave to a distance indicative of a surface level of the groundwater below grade.

2. The groundwater monitoring system according to claim 1, wherein when the conductivity sensor initially detects the groundwater, the probe sends a control signal to the controller to record the distance between the first and second sonic transducers which represents the surface level of the groundwater.

3. The groundwater monitoring system according to claim 1, wherein the drive mechanism is an electric motor mechanically coupled to the drum which is operable to rotate the drum in the first or second directions.

4. The groundwater monitoring system according to claim 3, further comprising an auto-reverse feature wherein: when the drum is rotated in the second direction to lower the probe and the conductivity sensor is initially immersed in and detects the groundwater a first time, the probe sends a control signal to the controller which automatically rotates the drum in the opposite first direction to withdraw the conductivity sensor from the groundwater, and the controller then automatically rotates the drum in the second direction again to re-immerse the conductivity sensor and detect the groundwater a second time; and
the controller records the distance between the first and second sonic transducers the second time which represents a surface level of the groundwater.

5. The groundwater system according to claim 3, wherein the motor automatically lowers the probe at a first speed until the probe detects the surface level of the groundwater, and then automatically lowers the probe at a slower second speed through the groundwater below the surface level for profiling properties of the groundwater.

6. The groundwater monitoring system according to claim 1, wherein the probe further includes a temperature sensor operable to measure temperature of the ambient environment surrounding the probe and transmit the first temperature to the controller.

7. The groundwater monitoring according to claim 6, wherein when the probe travels down the borehole in an air column above the groundwater surface level, the temperature sensor measures air temperature, the controller receiving the air temperature from the probe and operates to apply a temperature correction factor to the distance measured between the first and second sonic transducers for improving measurement accuracy.

8. The groundwater monitoring system according to claim 7, wherein the temperature sensor in the probe continuously measures air temperature from the borehole head to the groundwater surface level and the controller builds an air temperature profile for the air column.

9. The groundwater monitoring system according to claim 7, wherein the controller or the probe further includes a pressure sensor operable to measure barometric pressure of the ambient environment, and the controller is operable to apply a pressure correction factor based on the measured barometric pressure to the distance measured between the first and second sonic transducers for improving accuracy.

10. The groundwater monitoring system according to claim 1, wherein the probe further includes a pressure sensor operable to measure a pressure of the ambient environment surrounding the probe and transmit the pressure to the controller.

11. The groundwater monitoring system according to claim 10, wherein as the probe travels downwards through the groundwater, a first depth of the probe within the groundwater is determined by the controller comparing a pressure measured at the first depth and atmospheric pressure in the borehole.

12. The groundwater monitoring system according to claim 11, wherein as the probe stays at the first depth under groundwater surface level, the controller raises the probe upwards out of the groundwater which is detected by the conductivity sensor, and the pressure sensor on probe is calibrated with reference to ambient barometric pressure in the borehole.

13. The groundwater monitoring system according to claim 1, wherein the first and second sonic transducers communicate with the controller via wired or wireless means.

14. The groundwater monitoring system according to claim 1, wherein the drive mechanism is a manual crank mechanically coupled to the drum for rotating the drum.

15. The groundwater monitoring system according to claim 1, further comprising an accelerometer disposed in the probe, wherein when the probe travels through the groundwater and contacts a hard surface at a bottom of the groundwater, the accelerometer becomes tilted which triggers the system to measure a thickness of the groundwater.

16. The groundwater monitoring system according to claim 1, wherein the probe includes a microprocessor configured to establish two-way communication with the controller at the borehole head.

17. The groundwater monitoring system according to claim 1, wherein the controller continuously measures a distance of the probe between the borehole head and groundwater surface level as the probe travels downwards in the borehole.

18. A groundwater monitoring system comprising:
an underground aquifer;
a borehole extending underground between the aquifer and a borehole head at top located at a ground surface;
a rotatable cable drum positioned at the borehole head and comprising a spool of cable;
a drive mechanism coupled to the cable drum and operable to rotate the drum in opposing directions;
a movable probe disposed in the borehole and operably coupled to the cable, the drum rotatable via the drive mechanism in a first direction to raise the probe and in a second direction to lower the probe in the borehole;
a controller comprising programmable electronic circuitry including a processor and memory, the controller operably connected to and controlling operation of the drive mechanism;
a stationary sonic transducer mounted at the borehole head;
a movable sonic transducer mounted to the probe and spatially separable from the first sonic transducer, the stationary and moving transducers in communication with the controller;
one of the stationary or movable sonic transducers being a transmitter emitting an acoustic wave which is received by the other transducer being a receiver; and
a conductivity sensor mounted to the probe and operable to detect a groundwater in the borehole; and
an accelerometer disposed in the probe, wherein when the probe contacts a hard surface at a bottom of the groundwater, the accelerometer becomes tilted which triggers the system to measure a thickness of the groundwater.

19. The groundwater monitoring system according to claim 18 wherein when the conductivity sensor initially detects the groundwater, the probe sends a control signal to the controller to record the distance between the first and second sonic transducers which represents the surface level of the groundwater.

20. The groundwater monitoring system according to claim 19, wherein the drive mechanism is an electric motor mechanically coupled to the drum which is operable to rotate the drum in the first or second directions.

21. A method for monitoring groundwater, the method comprising:
providing a probe having at least one sensor and an electronic controller with a processor and electric drive mechanism controlled by the processor, the drive mechanism operably coupled to the probe for lowering or raising the probe in a borehole having a top accessible at ground grade;
the controller automatically lowering the probe down the borehole at a first speed with the drive mechanism;
contacting and sensing groundwater in the borehole with the probe a first time;
a sonic transmitter at the probe generating and directing an acoustic wave upwards in the borehole upon sensing the groundwater;
receiving the acoustic wave with a sonic receiver at the top of the borehole;
the controller automatically calculating a first time delay between transmission and reception;
the controller automatically converting the first time delay into a first distance measured between the transmitter and receiver which is indicative of the groundwater level below grade;
the controller automatically raising the probe out of the groundwater with the drive mechanism for a distance after sensing the groundwater the first time; and
the controller automatically lowering the probe again with the drive mechanism to contact and sense the groundwater a second time, the probe being lowered at a second speed the second time which is slower than the first speed;
the controller automatically calculating a second time delay between transmission and reception; and
the controller automatically converting the second time delay into a second distance measured between the transmitter and receiver which is indicative of the groundwater level below grade.

22. The method according to claim 21, wherein the groundwater is sensed by a conductivity sensor mounted to the probe.

23. The method according to claim 21, further comprising a step of the controller automatically lowering the probe through the groundwater at a second speed slower than the first speed, and measuring properties of the groundwater with a sensor array mounted to the probe.

24. A method for monitoring groundwater, the method comprising:
providing a probe having at least one sensor and an electronic controller with a processor and electric drive mechanism controlled by the processor, the drive mechanism operably coupled to the probe for lowering or raising the probe in a borehole having a top accessible at ground grade;
the controller automatically lowering the probe down the borehole at a first speed with the drive mechanism;
contacting and sensing groundwater in the borehole with the probe a first time;
a sonic transmitter at the probe generating and directing an acoustic wave upwards in the borehole upon sensing the groundwater;
receiving the acoustic wave with a sonic receiver at the top of the borehole;
the controller automatically calculating a first time delay between transmission and reception;
the controller automatically converting the first time delay into a first distance measured between the transmitter and receiver which is indicative of the groundwater level below grade;
the controller automatically lowering the probe through the groundwater;

engaging a bottom of the groundwater with the probe a first time, the probe changing from a vertical position to a tilted position;

detecting the tilted position of the probe with an accelerometer mounted to the probe;

the controller automatically determining a thickness of the groundwater between the surface level of the groundwater and the bottom of the groundwater.

25. The method according to claim 24, further comprising:

the controller automatically raising the probe with the drive mechanism for a distance after engaging the bottom of the groundwater the first time;

the controller automatically lowering the probe again with the drive mechanism to engage the bottom of the groundwater a second time, the probe being lowered at a third speed the second time which is slower than the first speed; and the controller automatically determining a thickness of the groundwater between the surface level of the groundwater and the bottom of the groundwater a second time.

* * * * *